US006868216B1

(12) United States Patent
Gehrke

(10) Patent No.: US 6,868,216 B1
(45) Date of Patent: Mar. 15, 2005

(54) FIBER OPTIC CABLE MANAGEMENT SYSTEM

(75) Inventor: Gary Curtis Gehrke, San Jose, CA (US)

(73) Assignee: Ciena Corporation, Linthicum, MD (US)

( * ) Notice: Subject to any disclaimer, the term of this patent is extended or adjusted under 35 U.S.C. 154(b) by 0 days.

(21) Appl. No.: 09/916,364

(22) Filed: Jul. 27, 2001

(51) Int. Cl.[7] ................................................. G02F 1/01
(52) U.S. Cl. ...................................................... 385/134
(58) Field of Search .............................. 385/134, 135–7

(56) References Cited

U.S. PATENT DOCUMENTS

| | | | |
|---|---|---|---|
| 5,237,640 A | | 8/1993 | Pedraza et al. .............. 385/136 |
| 5,353,367 A | | 10/1994 | Czosnowski et al. ........ 385/135 |
| 5,383,051 A | | 1/1995 | Delrosso et al. ............. 359/341 |
| 5,469,526 A | | 11/1995 | Rawlings ...................... 385/135 |
| 5,740,300 A | | 4/1998 | Hodge .......................... 385/135 |
| 5,774,617 A | * | 6/1998 | Stockman et al. ........... 385/134 |
| 5,907,654 A | | 5/1999 | Render et al. ................ 385/135 |
| 6,263,141 B1 | * | 7/2001 | Smith ........................... 385/135 |
| 6,289,160 B1 | * | 9/2001 | Daoud .......................... 385/135 |
| 6,388,891 B1 | * | 5/2002 | Falkenberg et al. .......... 385/134 |
| 6,438,311 B1 | * | 8/2002 | Zarnowitz .................... 385/135 |

FOREIGN PATENT DOCUMENTS

EP        0349207       3/1990

* cited by examiner

Primary Examiner—J. F. Duverne

(57) ABSTRACT

A fiber optic cable management system that includes a plurality of fiber optic cable management tools mounted on a module to be provided within an optical communications bay. Each fiber optic cable management tool includes a base portion, a first curved portion disposed on the base portion, and a second curved portion disposed on the base portion and spaced from the first curved portion. The first and second curved portions defining a passage or channel that is configured to accommodate a fiber optic cable, whereby the fiber optic cable is bent in the passage. A radius associated with the bent fiber optic cable exceeds a minimum bend radius of the fiber optic cable. Each fiber optic cable management tool further includes protruding member or handle that extends from the base portion to permit manual grasping of each fiber optic cable management tool while maintaining the radius associated with the bent fiber optic cable. If smaller diameter fiber optic cable is used in the system, one or more fiber optic cable management tools may include an insert removably provided therein. The removable insert has three integrally connected curved members. Each curved member has a base portion and a flange portion extending away from the base portion. The base portion of each curved member includes a curved portion having a radius that exceeds the minimum bend radius a smaller diameter fiber optic cable.

20 Claims, 5 Drawing Sheets

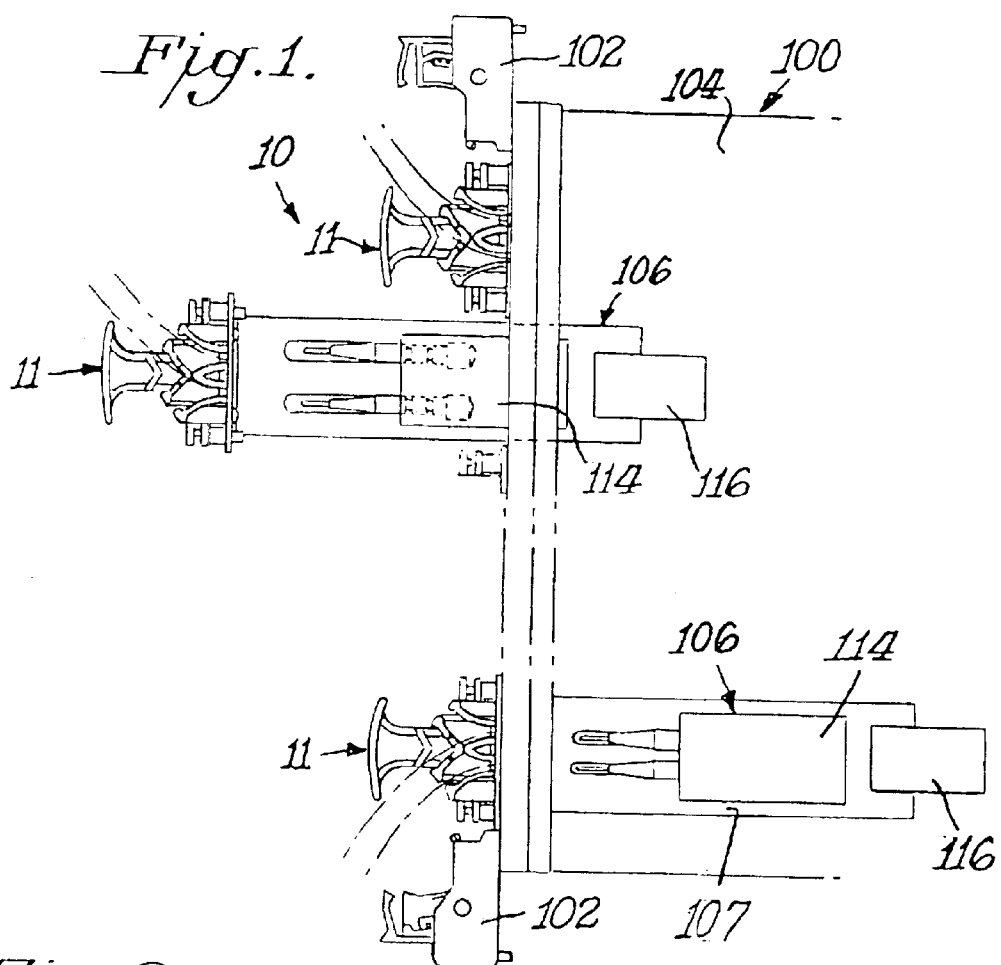
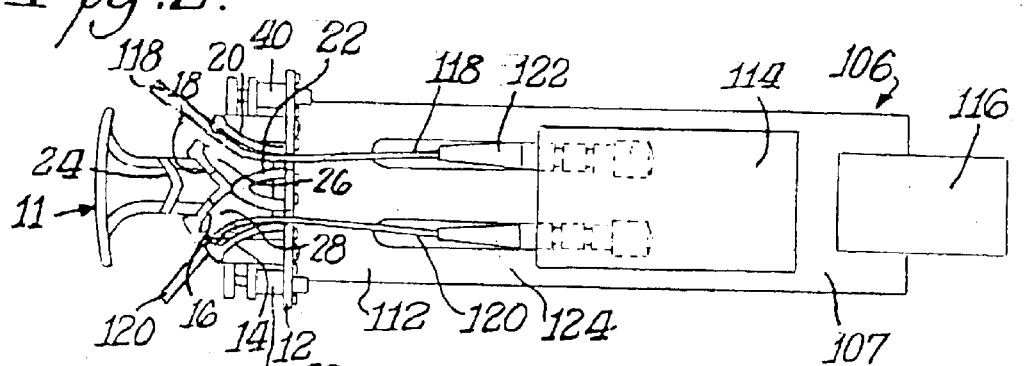
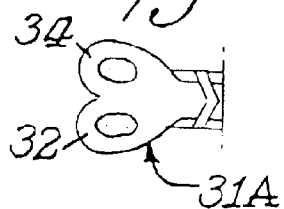

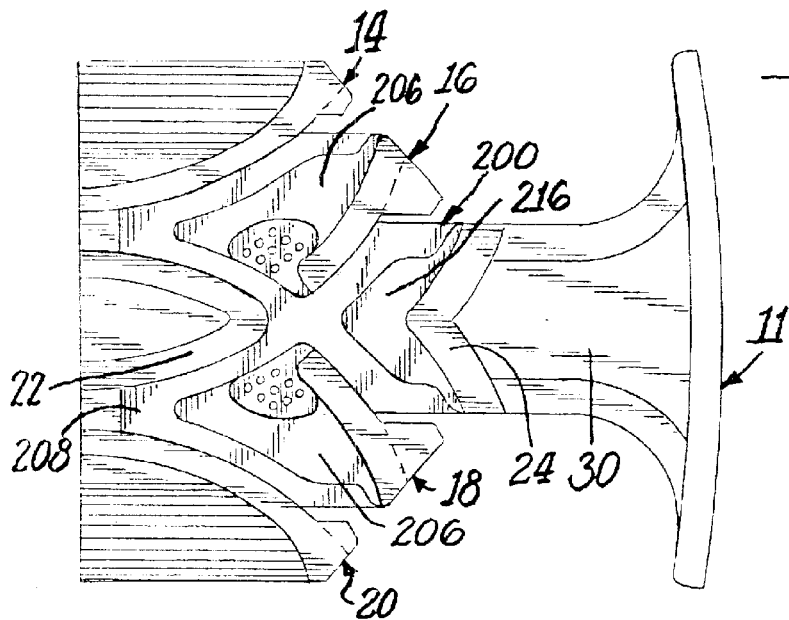
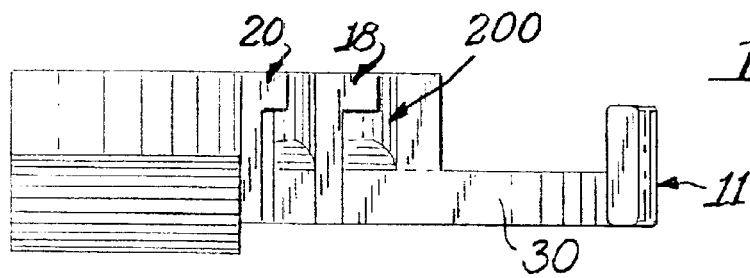
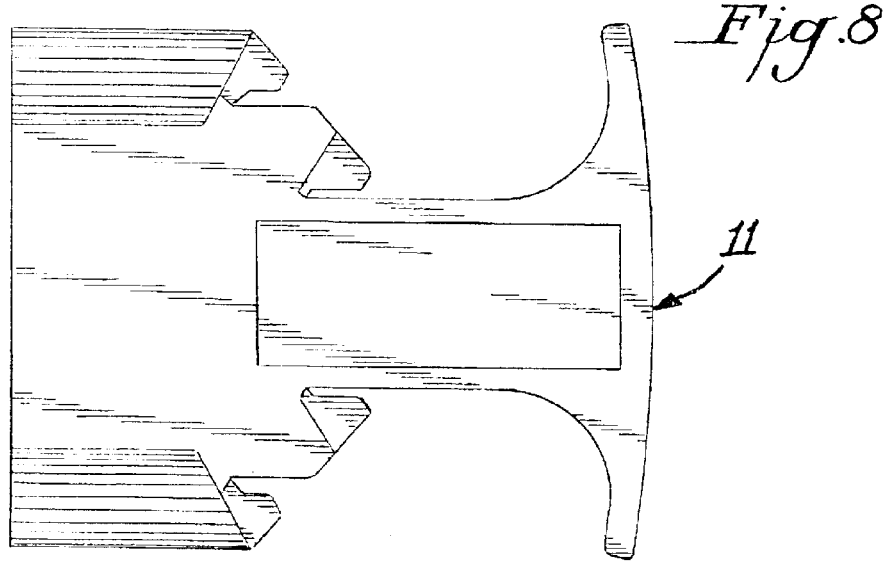

FIBER OPTIC CABLE MANAGEMENT SYSTEM

BACKGROUND OF THE INVENTION

A. Field of the Invention

The present invention relates generally to the communications field, and, more particularly to a fiber optic cable management system.

B. Description of the Related Art

Presently, it is a problem in the field of communication cable installation to ensure the precise placement of the communication cable without the possibility of damage to the communication cable by the provision of tight bends, or inappropriate use of fasteners, or inadequate support to the communication cable. Such communication cables include conventional telephone cable having a plurality of copper conductors, coaxial cable, optical fiber, or the like. In all of these applications, the minimum radius of curvature of the communication cable is well defined, and bending the communication cable in a tighter bend can cause damage to the communication medium housed within the cable. The installer of communication cable is thus faced with the problem of routing the communication cable over surfaces, which typically include sharp bends, without over bending the communication cable, yet also securing the communication cable to these surfaces in a manner to ensure protection from damage.

This problem is further heightened when fiber optic cables (alternatively referred to as "optical fibers" or "fibers") are used. Glass fibers used in such cables are easily damaged when bent too sharply and require a minimum bend radius to operate within required performance specifications. The minimum bend radius of a fiber optic cable depends upon a variety of factors, including the signal handled by the fiber optic cable, the style of the fiber optic cable, and equipment to which the fiber optic cable is connected. For example, some fiber optic cables used for internal routing have a minimum bend radius of 0.75 inches, and some fiber optic cables used for external routing have a minimum bend radius of 1.0 inches.

Damaged fiber optic cables may lead to a reduction in the signal transmission quality of the cables. Accordingly, fiber optic cables are evaluated to determine their minimum bend radius. As long as a fiber optic cable is bent at a radius that is equal to or greater than the minimum bend radius, there should be no reduction in the transmission quality of the cable. If a fiber optic cable is bent at a radius below the minimum bend radius determined for such cable, there is a potential for a reduction in signal transmission quality through the bend. The greater a fiber optic cable is bent below its minimum bend radius, the greater the potential for breaking the fiber(s) contained in the cable, and the shorter the life span of the cable.

Optical communication equipment is typically housed in bays, which include a rectangular frame having dimensions conforming to a particular standard, such as the Network Equipment Building Standard (NEBS). NEBS was originally developed by Bell Telephone Laboratories in the 1970s and expanded by Bellcore. Long a requirement for equipment used in the Central Office in the North American Public Switched Network, the NEBS criteria have become a universal measure of network product excellence.

NEBS covers a large range of requirements including criteria for personnel safety, protection of property, and operational continuity. NEBS covers both physical requirements including: space planning, temperature, humidity, fire, earthquake, vibration, transportation, acoustical, air quality and illumination; and electrical criteria including: electrostatic discharge (ESD), electromagnetic interference (EMI), lightning and AC power fault, steady state power induction, corrosion, DC potential difference, electrical safety and bonding and grounding. The term "electrostatic discharge" or "ESD", as used herein, refers to the rapid, spontaneous transfer of electrostatic charge induced by a high electrostatic field. Usually the charge flows through a spark (static discharge) between two bodies at different electrostatic potentials as they approach one another.

An optical communications equipment frame further typically has a plurality of shelves, each having one or more slots for accommodating circuit boards or cards that have optical and electrical components associated with a communication network mounted thereon. The components include, but are not necessarily limited to lasers, photodetectors, optical amplifiers, switching elements, add/drop multiplexers etc. In addition, fiber optic cables typically connect to one or more component.

If a network component requires maintenance or an upgrade, the card containing the component or a component module is typically removed from the shelf. However, since fiber optic cables are typically fragile, if the fiber optic cable is bent beyond the minimum bend radius during board or module removal, the fiber optic cable may break. Accordingly, removal and insertion of component boards or modules can be difficult and inconvenient.

Furthermore, the recent increase in bandwidth requirements for telecommunications systems has resulted in more densely packed equipment and fiber optic cables than prior systems. Many carriers or other consumers of optical communications equipment have a very limited floor space in which to place new equipment and fiber optic cables. For example, some carriers may only have a single open bay (or shelf) in which to place new equipment and fiber optic cables. If the communications equipment can be more densely packed, then a greater amount of equipment and fiber optic cables may be placed within the available space. The fiber optic cables housed within optical communications equipment is also exposed to damage when the doors to the equipment are closed due to the close fit between the doors and the fiber optic cables.

Thus, it is even more necessary now to be able to bend fiber optic cables around corners and other obstacles in order to route the cables to and from equipment such as computers, connector panels, junction boxes, etc. In some conventional systems, standard plastic parts route the fiber optic cables. These plastic parts are often too large and generic to work in the new, denser systems. In other conventional systems, custom sheet metal parts route the fiber optic cables. Custom sheet metal is expensive and also cannot be used in the new, denser optical communications systems, since they can cause damage to the densely-packed fiber optic cables in such systems.

Thus, there is a need in the art to provide an inexpensive means for routing fiber optic cables in the new, denser optical communications systems that may be easily customized by an installer and prevent the fiber optic cables from being bent beyond their minimum bend radii.

SUMMARY OF THE INVENTION

The present invention solves the problems of the related art by providing a fiber optic cable management system that may be provided in a bay (or shelf) of an optical communications housing, the fiber optic cable management system including at least one and preferably several fiber optic cable management tools. Each tool is capable of routing fiber optic cables in multiple directions without bending the cables beyond their minimum bend radii. If smaller diameter fiber optic cables are used in the system, one or more fiber optic cable management tools may include an insert removably provided therein. The combination of the tool and the removable insert retains fiber optic cables having smaller diameters, and is capable of routing fiber optic cables in multiple directions without bending the cables beyond their minimum bend radii.

Further scope of applicability of the present invention will become apparent from the detailed description given hereinafter. However, it should be understood that the detailed description and specific examples, while indicating various embodiments of the invention, are given by way of illustration only, since various changes and modifications within the spirit and scope of the invention will become apparent to those skilled in the art from this detailed description. It is to be understood that both the foregoing general description and the following detailed description are exemplary and explanatory only and are not restrictive of the invention, as claimed.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 1 is a side elevational view showing a fiber optic cable management system provided with an optical communications module, and in accordance with an embodiment of the present invention;

FIG. 2 is a top plan view of one fiber optic cable management tool of the fiber optic cable management system shown in FIG. 1, showing the interrelation with the optical modules of the optical communications module;

FIG. 3 is a top plan view of an alternative embodiment of a handle for use with the fiber optic cable management tool shown in FIG. 2;

FIG. 7A is a top plan view of the insert shown in FIGS. 6A–6C as it is inserted in the fiber optic cable management tool shown in FIGS. 2, 4, and 5;

FIG. 8 is a bottom plan view of the fiber optic cable management tool shown in FIG. 7A; and FIG. 9 is a left side elevational view of the insert and fiber optic cable management tool shown in FIG. 7A.

DETAILED DESCRIPTION OF EMBODIMENTS OF THE INVENTION

Figure 4:
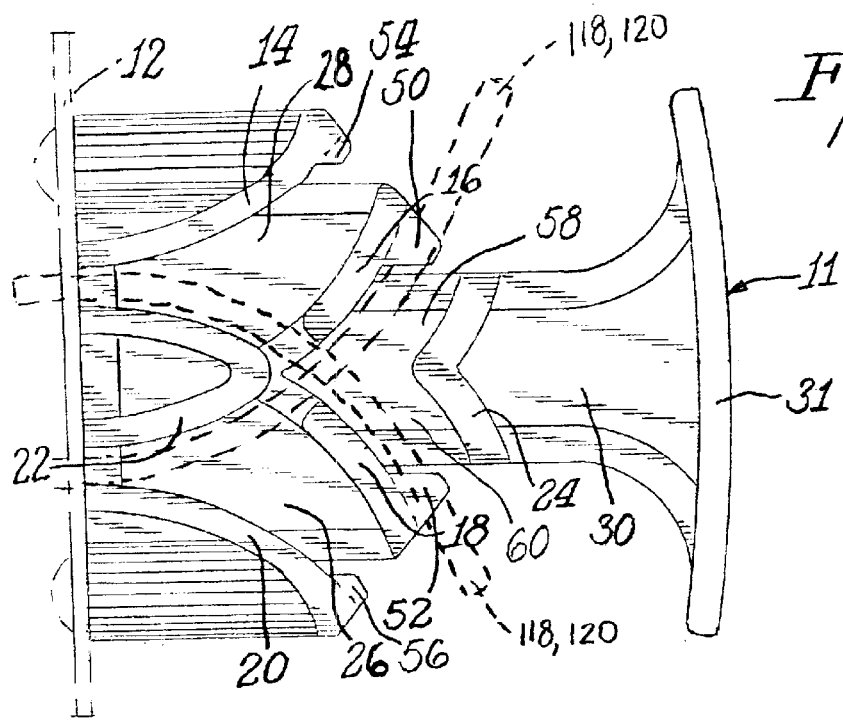
FIG. 4 is a top plan view of the fiber optic cable management tool shown in FIG. 2.

The following detailed description of the invention refers to the accompanying drawings. The same reference numbers in different drawings identify the same or similar elements. Also, the following detailed description does not limit the invention. Instead, the scope of the invention is defined by the appended claims and equivalents thereof.

The expression "optically communicates" as used herein refers to any connection, coupling, link or the like by which optical signals carried by one optical system element are imparted to the "communicating" element. Such "optically communicating" devices are not necessarily directly connected to one another and may be separated by intermediate optical components or devices.

Referring now specifically to the drawings, a fiber optic cable management system according to an embodiment of the present invention is illustrated in FIG. 1 and shown generally as reference numeral 10. The system 10 has particular application in the telecommunications industry for managing the connection, storage, and distribution of fiber optic cables. FIG. 1 shows fiber optic cable management system 10, which includes a plurality of fiber optic cable management tools 11, and multiple line modules 100 that may be installed in an optical communications cabinet (not shown) with respective mounting brackets 102 used for mounting line modules 100 to support racks (not shown) of the optical communications cabinet. Fiber optic cables (shown in phantom) may be provided from above or below system 10. Only a single line module 100 is described below.

Fiber optic cable management system 10 may include a plurality of fiber optic cable management tools 11. Such fiber optic cable management tools 11 are described in co-pending U.S. patent application Ser. No. 09/587,020, filed Jun. 5, 2000, the disclosure of which is herein incorporated by reference in its entirety. Although fiber optic cable management system 10 of FIG. 1 only shows three fiber optic cable management tools 11, system 10 may have an application-specific number fiber optic cable management tools, ranging from one to as many that will fit within line module 100. Furthermore, although FIG. 2 shows only two fiber optic cables being channeled through each of the fiber optic cable management tools 11, more or less than two cables may be channeled through each fiber optic cable management tool 11, depending upon the application for which fiber optic cable management system 10 is being utilized. Management tool 11 may be separate from or integral with system 10.

As further shown in FIG. 1, each fiber optic cable management tool 11 preferably is identical, but may have different sizes, depending upon the optical communications application. Since each guide is preferably identical, reference will be made to a single fiber optic cable management tool 11, but applies equally to all fiber optic cable management tools 11.

Line module 100 includes a tray or pan 104 upon which optical modules 106 are mounted. Each module 106 includes, for example, at least one optical component that couples to a corresponding electronic module, for forwarding and/or processing electronic signals to/from modules 106. Each module 106 is further coupled to a corresponding fiber optic cable management tool 11.

FIG. 2 illustrates one of the exemplary modules 106 and fiber optic cable management tool 11 in greater detail. Module 106, for example, includes transmission/receiver (transceiver) circuitry 107 disposed on a substrate 112 along with a laser module 114 and a photodetector module 116. Circuitry 107 includes components for generating electrical signals for driving laser 114, and sensing electrical signals output from photodector 116. Laser 114 supplies optical signals to a fiber optic cable 118, while another fiber optic cable 120 feeds optical signals to photodetector 116. The positions of laser module 114 and photodetector module 116 may be switched depending upon the application. Conventional "boots" 122 and 124 typically include semi-rigid plastic portions for securing fiber optic cables 118 and 120, respectively, to their connectors and providing bending strain relief.

As further shown in FIG. 2, fiber optic cables 118, 120 are fed through fiber optic cable management tool 11, which is secured to substrate 112 through a connection mechanism, such as, for example, screws or fasteners. A conventional connection mechanism such as screws or fasteners 40, 42 further connect tool 11 to the faceplate of module 100. Tool 11 includes a base portion 12 upon which arcuate or curved portions 14, 16, 18, 20, 22 are formed, as best seen in FIG. 4.

A guide member 24 is also formed on base portion 12. Curved portions 18, 20, 22, for example, define a channel 26 through which fiber optic cable 118 is disposed, while curved portions 14, 16, 22 define a channel 28 through which fiber optic cable 120 is disposed. Fiber optic cables 118, 120 are bent within channels 26, 28, respectively, at an associated radius which exceeds the minimum bend radius of fiber optic cables 118, 120.

As shown in FIG. 4, a projection portion 54 may be provided on curved portion 14, a projection portion 50 may be provided on curved portion 16, a projection portion 52 may be provided on curved portion 18, and a projection portion 56 may be provided on curved portion 20. Curved portions 14, 16, 18, 20, for example, assist in maintaining fiber optic cables 118, 120 within a particular channel. Fiber optic cables 118, 120 are then retained in tool 11 by projections portions 50, 52, 54, 56. Fiber optic cables 118, 120 may be slipped between curved portions 14, 16, 18, 20 and projections portions 50, 52, 54, 56, and are held in place by being retained under these projections portions 50, 52, 54, 56. Fiber optic cables 118, 120 may be removed from tool 10 by manipulating cables 118, 120 from under projections portions 50, 52, 54, 56.

A protruding member 30 may extend from base portion 12, and includes a handle 31, which can be manually grasped for readily removing and/or inserting module 106 into a corresponding place on pan or tray 104. FIG. 2 illustrates handle 31 being substantially T-shaped. Alternatively, as shown in FIG. 3, handle 31A may include a first looped portion 32 and a second looped portion 34 for accommodating fingers of a user. The combination of either handle 31, 31A with the above-described curved portions 14, 16, 18, 20, 22 provides access to module 106 while maintaining appropriate minimum bend radii of attached fiber optic cables 118, 120. The handle of tool 11 may have a variety of other configurations as long as tool 11 can easily removed from module 100 by grasping the handle. For example, the handle may also be L-shaped, have a knob, etc.

Figure 5:
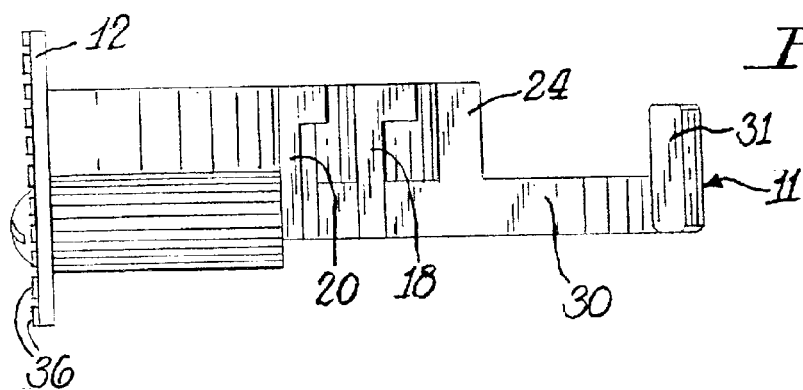
FIG. 5 is a right side view of the fiber optic cable management tool shown in FIGS. 2 and 4.

In addition, as shown in FIGS. 4 and 5, a conductive portion 36 optionally attaches to tool 10 in order to shield laser 114, photodetector 116, and circuitry 107 from radio frequency (RF) or other electromagnetic radiation. Conductive portion 36 includes a plurality of resilient portions for contacting substrate 212 to provide a ground conductor on substrate 212. Accordingly, adequate electromagnetic shielding can be obtained.

In the particular example, as shown in FIGS. 2 and 4, fiber optic cables 118, 120 are disposed in different directions. However, fiber optic cable 118 could be fed along a part of portion 22 and through a channel or passage 58 defined by guiding member 24 and curved portion 16. This would result in concentric paths for cables 118, 120, as shown at the bottom of FIG. 1. Alternatively, fiber optic cable 120 could be fed along a part of portion 22 and through a channel or passage 60 defined by guiding member 14 and curved portion 18. This would result in concentric paths for cables 118, 120, as shown at the top of FIG. 1. In either case, both fiber optic cables 118, 120 would exit tool 111 in the same direction.

There are a variety of ways to manufacture fiber optic cable management tools 11. Tools 11 may be cast from a metal, but preferably are injection molded. If molding is selected, tools 11 may be molded from a compliant, high-strength plastic, but may be molded out of a variety of materials meeting the rigorous Network Equipment Building System (NEBS) reliability and flammability ratings. Thus, fiber optic cable management tools 11 may be made from a material that attenuates ESD, EMI, or other destructive energy. In this regard, tools 11 may be made from a heavily nickel-doped plastic.

Fiber optic cables come in a variety of sizes. For example, some fiber optic cables have three millimeter diameters, and some fiber optic cables have two millimeter diameters. Fiber optic cables having such sizes work quite well in fiber optic cable management tool 11. However, some fiber optic cables have smaller diameters and minimum bend radii. For example, some cables have 1.6 millimeter of 1.7 millimeter diameters. These cables, due to their smaller diameters, tend to freely move within fiber optic cable management tool 11 and not be fully retained, exposing them to potential damage. It is desirable that such smaller diameter fiber optic cables be used with fiber optic cable management tool 11 without freely moving within tool 1, or disengaging from tool 11 unexpectedly.

Figure 6A:
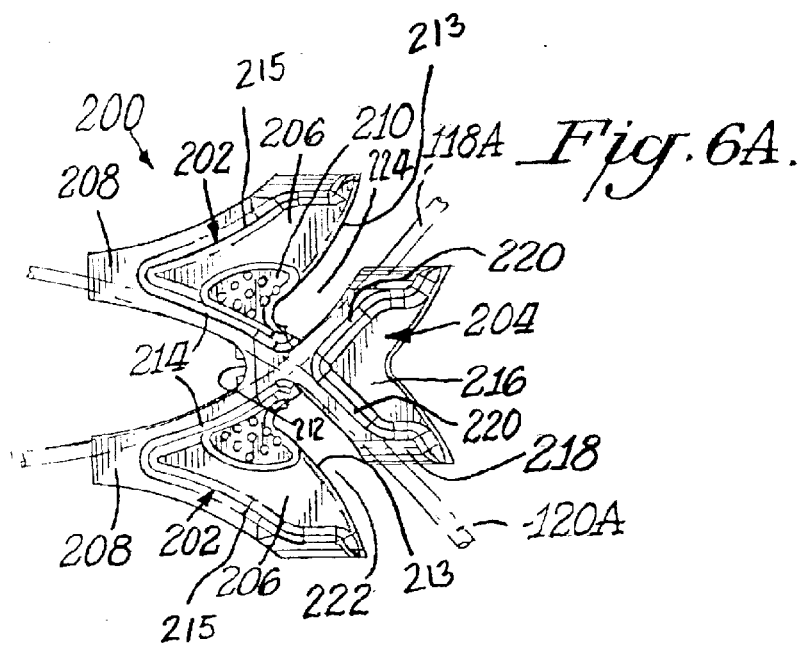
FIG. 6A is a top plan view of an insert that may be used with the fiber optic cable management tool shown in FIGS. 2 and 4–6, and in accordance with another embodiment of the present invention.
Figure 6B:
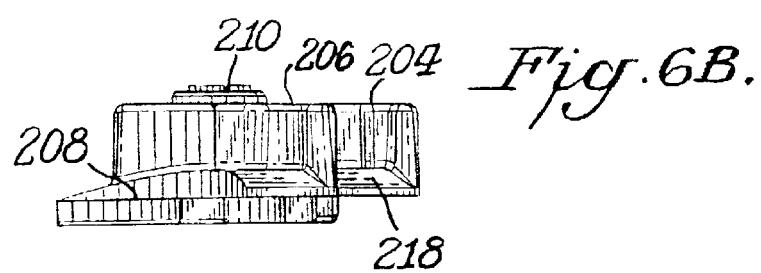
FIG. 6B is a left side view of the insert shown in FIG. 6A.
Figure 6C:
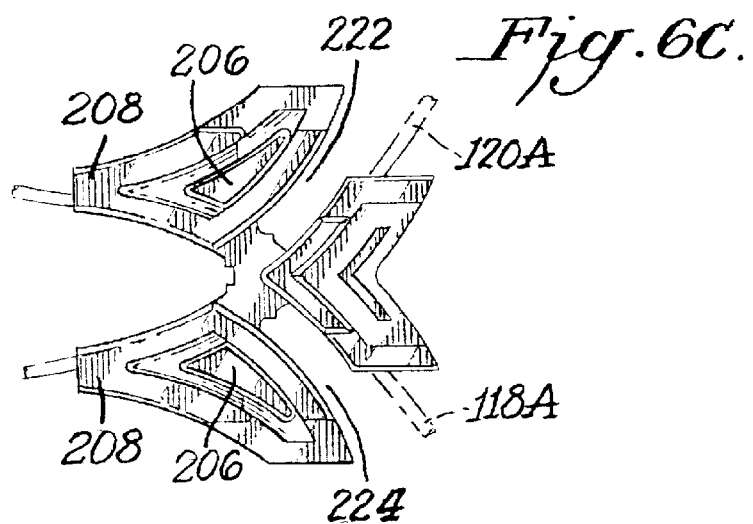
FIG. 6C is a bottom plan view of the insert shown in FIGS. 6A and 6B.

A removable insert for fiber optic cable management tool 11 according to an embodiment of the present invention is illustrated in FIGS. 6A–6C and shown generally as reference numeral 200. Insert 200 may be placed within fiber optic cable management tool 11 (as shown in FIG. 7A, described below) to prevent smaller diameter (e.g., 1.7 millimeter) fiber optic cables from freely moving within tool 11. Insert 200 allows for handling smaller diameter fiber optic cables having alternative minimum bend radii. Tool 11 includes three integrally connected curved members 202, 204, with two curved members 202 being identical.

Each curved member 202 includes a base portion 206 and a flange portion 208 extending away from and integral with base portion 206. Base portion 206 includes a raised portion 210 having ridges or bumps formed thereon to aid insertion of insert 200 into tool 11. Base portion 206 further includes a protrusion 212 that extends away from the rest of base portion 206, and curved portions 213, 214, 215 having radii that exceed the minimum bend radius of smaller diameter fiber optic cables 118A, 120A.

Curved member 204 includes a base portion 216 and a flange portion 218 extending away from and integral with base portion 216. Base portion 216 further includes two curved portions 220 having radii that exceed the minimum bend radius of smaller diameter fiber optic cables 118A, 102A. When insert 200 is placed within tool 11, curved portions 220 and protrusions 212 form channels 222, 224 for guiding fiber optic cables 120A, 118A, respectively, through insert 200 and fiber optic cable management tool 11. These channels are narrower than the channels of tool 11, as described previously. This narrowing of channels in the combined assembly prevents fiber optic cables 118A, 120A from freely moving in insert 11, and thus prevent cables 118A, 120A from slipping out from under projections portions 50, 52, 54, 56 of tool 11 and being damaged.

Removable insert 200 may be made from a variety of materials, including but not limited to rubber (natural or synthetic), thermoplastic, plastic, or other moldable material.

FIG. 7A shows insert 200 provided within fiber optic cable management tool 11. To provide insert 200 within tool 11, a user need only align insert 200 with tool 11 and force insert 200 therein. To remove insert 200 from tool 11, a user need only pry insert 200 from tool 11.

Figure 7B:
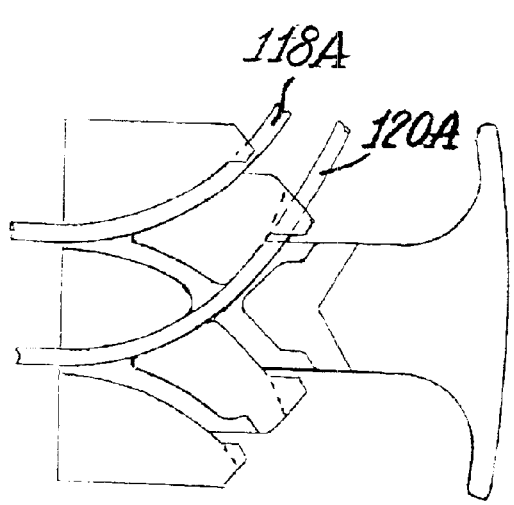
FIG. 7B is a top plan view of the insert and fiber optic cable management tool combination shown in FIG. 7A, and showing a fiber optic cable routing scheme.
Figure 7C:
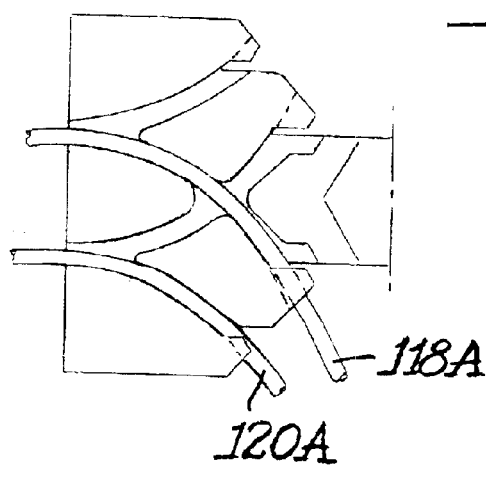
FIG. 7C is a top plan view of the insert and fiber optic cable management tool combination shown in FIG. 7A, and showing another fiber optic cable routing scheme.
Figure 7D:
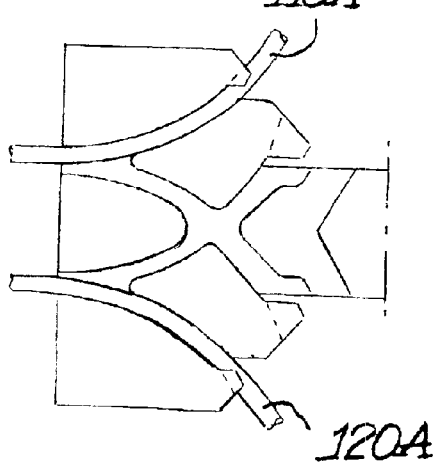
FIG. 7D is a top plan view of the insert and fiber optic cable management tool combination shown in FIG. 7A, and showing still another fiber optic cable routing scheme.

FIGS. 7B–7D show the fiber optic cable routing schemes possible with the insert 200 and tool 11 combination shown in FIG. 7A. As shown in FIG. 7B, both fiber optic cables 118A, 120A may be exit the combination in an upward direction. Alternatively, as shown in FIG. 7C, both fiber optic cables 118A, 120A may exit the combination in a downward direction. Further, as shown in FIG. 7D, fiber optic cable 118A may exit the combination in an upward direction, and fiber optic cable 120A may exit the combination in a downward direction.

The curved portions 14, 16, 18, 20, 22 of each fiber optic cable management tool 11 and curved members 202, 204 of removable insert 200 prevent fiber optic cables from being bent beyond their minimum bend radii. This prevents the glass fibers used in fiber optic cables from being damaged, ensuring the signal transmission quality and integrity of the cables. The fiber optic cable management tool 11 and removable insert 200 also contain no sharp edges, which further prevents fiber optic cables from being damaged.

The radius of curved members 14, 16, 18, 20, 22 of each fiber optic cable management tool 11 and of curved members 202, 204 of insert 200 may vary depending upon the fiber optic cable being used with fiber optic cable management system 10 of an embodiment of the present invention. However, the minimum bend radius of the fiber optic cables being used dictates the radius of curved portions 14, 16, 18, 20, 22 of each tool 11 and curved members 202, 204 of each insert 200. As discussed previously, the minimum bend radius of a fiber optic cable depends upon a variety of factors, including the signal handled by the fiber optic cable, the style of the fiber optic cable, and equipment to which to fiber optic cable is connected. Thus, curved portions 14, 16, 18, 20, 22 of each tool 11 and curved members 202, 204 of each insert 200 may have a variety of radii greater than or equal to the minimum bend radii of the fiber optic cables, depending upon the type of cables being utilized. Curved portions 14, 16, 18, 20, 22 of each tool 11 and curved members 202, 204 of each insert 200 may, for example, have a radius greater than or equal to 0.75 inches (for fiber optic cables having a minimum bend radius of 0.75 inches), or a radius greater than or equal to 1.0 inches (for fiber optic cables having a minimum bend radius of 1.0 inches).

It will be apparent to those skilled in the art that various modifications and variations can be made in the fiber optic cable management system of the present invention and in construction of this system without departing from the scope or spirit of the invention. As an example, typically, fiber optic cable management system 100 of the present invention will include multiple, interconnected uniform fiber optic cable guides, wherein all of the guides have the same dimensions. However, system 100 could also include multiple, interconnected fiber optic cable guides, with each guide having different dimensions.

System 100 of the present invention is not limited to use with fiber optic cables, and may be used with any cable having a minimum bend radius or having a need for organization, such as, for example, telephone cable having a plurality of copper conductors, coaxial cable, or the like. In such an application, the fiber optic cables shown in the drawings, would be replaced with any cable having a minimum bend radius, such as telephone cable having a plurality of copper conductors, coaxial cable, or the like. Other examples of the modifications and variations that may be made to fiber optic cable management system of the present invention were set forth previously.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. An insert removably provided within a fiber optic cable management tool having at least one arcuate portion, comprising:

at least one curved member having a curved portion;

the at least one curved member of the insert facing the at least one arcuate portion of the fiber optic cable management tool when the insert is provided within the fiber optic cable management tool, thereby forming a channel having two sides along a length thereof, one side being the at least one arcuate portion of the fiber optic cable management tool and an opposite side being the at least one curved member of the insert, the channel having a radius that exceeds the minimum bend radius of a fiber optic cable to be provided in the fiber optic cable management tool.

2. An insert as recited in claim 1, wherein the channel has a radius that exceeds the minimum bend radius of a fiber optic cable having a diameter less than or equal to 1.7 millimeters.

3. An insert as recited in claim 1, wherein the channel formed by the curved portion of said at least one curved member and the arcuate portion of the fiber optic cable management tool has a smaller width than a channel provided in the fiber optic cable management tool.

4. An insert as recited in claim 1, wherein the channel formed by the curved portion of said at least one curved member and the arcuate portion of the fiber optic cable management tool changes orientation of the fiber optic cable to be provided in the fiber optic cable management tool.

5. A fiber optic cable guiding insert, comprising:

a first curved member having first and second curved portions, the first curved portion of said first curved member having a radius that exceeds a minimum bend radius of a fiber optic cable to be guided by the insert;

a second curved member having first and second curved portions, the first curved portion of said second curved member having a radius that exceeds the minimum bend radius of the fiber optic cable; and a third curved member having first and second curved portions which join each other at a point between the first curved member and the second, curved member, wherein the second curved portion of said first curved member and the first curved portion of said third curved member form a first channel having a radius that exceeds the minimum bend radius of the fiber optic cable, and the second curved portion of said second curved member and the second curved portion of said third curved member form a second channel having a radius that exceeds the minimum bend radius of the fiber optic cable.

6. A fiber optic cable guiding insert as recited in claim 5, wherein said first, second, and third curved members are integrally connected.

7. A fiber optic cable guiding insert as recited in claim 5, wherein the first curved portion of said first curved member, the first curved portion of said second curved member, and the first and second channels have radii that exceed the minimum bend radius of a fiber optic cable having a diameter less than or equal to 1.7 millimeters.

8. A fiber optic cable guiding insert, comprising:
   at least one curved member having first, second, and third curved portions, and a flange at a distal end of the first and the second curved portions, the first, second, and third curved portions having radii that exceed a minimum bend radius of a fiber optic cable to be guided by the insert, wherein at least two of the curved portions are concave-shaped and are joined at the flange.

9. A fiber optic cable guiding insert as recited in claim 8, wherein the first, second, and third curved portions have radii that exceed the minimum bend radius of a fiber optic cable having a diameter less than or equal to 1.7 millimeters.

10. A fiber optic cable management system, comprising:
    at least one fiber optic cable management tool having a base portion, a first arcuate portion and a second arcuate portion disposed on the base portion, and a protruding member extending from the base portion to permit manual grasping of said at least one fiber optic cable management tool; and
    at least one insert removably provided between the first and the second arcuate portions of said at least one fiber optic cable management tool and having at least one curved member having a curved portion; and
    a channel formed between the first arcuate portion of said at least one fiber optic cable management tool and the at least one curved member of the insert, the channel having a radius that exceeds the minimum bend radius of a fiber optic cable to be provided within the channel.

11. A fiber optic cable management system as recited in claim 10, wherein the channel has a radius that exceeds the minimum bend radius of a fiber optic cable having a diameter less than or equal to 1.7 millimeters.

12. An insert as recited in claim 11, wherein the at least one arcuate portion of the fiber optic cable management tool includes a first arcuate portion and a second arcuate portion, and wherein the insert restricts a space between the first arcuate portion and the second arcuate portion of the fiber optic cable management tool.

13. A fiber optic cable management system as recited in claim 10, wherein the channel formed by the curved portion of said at least one curved member and the arcuate portion of said at least one fiber optic cable management tool has a smaller width than a channel provided in said at least one fiber optic cable management tool.

14. A fiber optic cable management system as recited in claim 10, wherein the channel formed by the curved portion of said at least one curved member and the arcuate portion of said at least one fiber optic cable management tool changes orientation of the fiber optic cable to be provided in said at least one fiber optic cable management tool.

15. A fiber optic cable management system as recited in claim 10, wherein a width of the channel formed between the first arcuate portion of said at least one fiber optic cable management tool and the at least one curved member of the insert is less than a distance between the first arcuate portion and the second arcuate portion of the fiber optic cable management tool.

16. A fiber optic cable management system as recited in claim 10, wherein the insert restricts a space between the first arcuate portion and the second arcuate portion of the fiber optic cable management tool.

17. A method of reducing a width of a channel provided in a fiber optic cable management tool, comprising
    providing the fiber optic cable management tool having a channel between a first arcuate portion and a second accurate portion thereof;
    providing an insert between the first arcuate portion and the second arcuate portion of the fiber optic cable management tool, the insert having at least one curved member which provides a second channel between the curved member of the insert and an arcuate portion of the fiber management tool, the second channel reducing the width of the channel provided in the fiber optic cable management tool, the second channel being a reduced-width channel having a radius that exceeds the minimum bend radius of a fiber optic cable to be provided within the reduced-width channel.

18. A method of reducing a width of a channel provided in a fiber optic cable management tool as recited in claim 17, wherein the reduced-width channel has a radius that exceeds the minimum bend radius of a fiber optic cable having a diameter less than or equal to 1.7 millimeters.

19. A method of reducing a width of a channel provided in a fiber optic cable management tool as recited in claim 17, wherein the reduced-width channel may retain a fiber optic cable having a diameter less than or equal to 1.7 millimeters.

20. A method of reducing a width of a channel provided in a fiber optic cable management system as recited in claim 17, wherein the step of providing an insert restricts a space between the first arcuate portion and the second arcuate portion of the fiber optic cable management tool.

* * * * *